US009856908B2

(12) United States Patent
Tanaka et al.

(10) Patent No.: US 9,856,908 B2
(45) Date of Patent: *Jan. 2, 2018

(54) THRUST BEARING AND BEARING DEVICE FOR CRANKSHAFT OF INTERNAL COMBUSTION ENGINE

(71) Applicant: DAIDO METAL COMPANY LTD., Naka-ku, Nagoya (JP)

(72) Inventors: Shiho Tanaka, Inuyama (JP); Yoshihiro Ozawa, Inuyama (JP)

(73) Assignee: DAIDO METAL COMPANY LTD., Nagoya-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/967,800

(22) Filed: Dec. 14, 2015

(65) Prior Publication Data

US 2016/0169277 A1 Jun. 16, 2016

(30) Foreign Application Priority Data

Dec. 15, 2014 (JP) .................................. 2014-253044

(51) Int. Cl.
*F16C 17/04* (2006.01)
*F16C 9/02* (2006.01)
*F16C 9/04* (2006.01)

(52) U.S. Cl.
CPC ................. *F16C 9/02* (2013.01); *F16C 9/04* (2013.01); *F16C 17/04* (2013.01)

(58) Field of Classification Search
CPC .... F16C 9/02; F16C 9/04; F16C 9/045; F16C 17/04; F16C 17/10; F16C 17/26; F16C 33/02; F16C 2360/18; F16C 2360/22
See application file for complete search history.

(56) References Cited

U.S. PATENT DOCUMENTS

| 6,149,310 A | 11/2000 | Ono et al. |
| 7,134,793 B2 * | 11/2006 | Thompson ............... F16C 9/02 384/123 |

(Continued)

FOREIGN PATENT DOCUMENTS

| JP | 11-201145 | 7/1999 |
| JP | 2001-323928 | 11/2001 |
| JP | 2014163402 A | 9/2014 |

OTHER PUBLICATIONS

Office Action issued Jun. 28, 2016 in corresponding Japanese patent application No. 2014-253044 (in Japanese).

(Continued)

*Primary Examiner* — James Pilkington
(74) *Attorney, Agent, or Firm* — Harness, Dickey & Pierce, P.L.C.

(57) ABSTRACT

A thrust bearing for receiving an axial force of a crankshaft of an internal combustion engine. The thrust bearing includes a pair of half thrust bearings having a semi-annular shape that form an annular shape by abutting their circumferential end surfaces. Each half thrust bearing include thrust reliefs formed adjacent to both circumferential end portions of a sliding surface receiving the axial force so that a wall thickness is thinner toward the circumferential end surface. A thrust relief length L2 at an inner end portion of the thrust relief positioned on a rear side of one of the half thrust beings in a rotational direction is larger than a thrust relief length L1 at an inner end portion of the thrust relief positioned on a front side of the other of the half thrust bearing in the rotational direction.

17 Claims, 12 Drawing Sheets

(56) References Cited

U.S. PATENT DOCUMENTS

| | | | |
|---|---|---|---|
| 9,188,159 B2 | 11/2015 | Tanaka et al. | |
| 2003/0128902 A1* | 7/2003 | Kennedy | F16C 9/02 384/275 |
| 2007/0081748 A1* | 4/2007 | Sitter | F16C 9/02 384/294 |
| 2016/0169271 A1* | 6/2016 | Tanaka | F16C 9/02 384/294 |

OTHER PUBLICATIONS

Office Action dated Jun. 28, 2016 in corresponding Japanese patent application No. 2014-253044 with English translation.

\* cited by examiner

THRUST BEARING AND BEARING DEVICE FOR CRANKSHAFT OF INTERNAL COMBUSTION ENGINE

BACKGROUND OF THE INVENTION (1) Field of the Invention

The present invention relates to a thrust bearing and a bearing device that receive an axial force of a crankshaft of an internal combustion engine.

(2) Description of Related Art

A crankshaft of an internal combustion engine is rotatably supported, at its journal portion, by a lower part of a cylinder block of an internal combustion engine via a main bearing which is configured by assembling a pair of half bearings into a cylindrical shape.

One or both of the pair of half bearings is used to be combined with a half thrust bearing which receives an axial force of the crankshaft. The half thrust bearing is provided at one or both of axial end surfaces of the half bearing.

The half thrust bearing receives the axial force generated in the crankshaft. That is, the half thrust bearing is placed for the purpose of bearing the axial force applied to the crankshaft when the crankshaft is connected to a transmission via a clutch, for example.

On a sliding surface side of the half thrust bearing close to both circumferential ends thereof, thrust reliefs are formed so that a bearing member becomes thinner toward the respective circumferential end surfaces. In general, the thrust relief is formed so that a length from the circumferential end surface to the sliding surface of the half thrust bearing, and a depth at the circumferential end surface are constant irrespective of the position in a radial direction. The thrust relief is formed in order to absorb misalignment of the end surfaces of the pair of half thrust bearings when mounting the half thrust bearings on a split type bearing housing (see FIG. 10 of JP-A-11-201145).

The crankshaft of the internal combustion engine is supported, at its journal portion, by the lower part of the cylinder block of the internal combustion engine via the main bearing consisting of the pair of half bearings. Here, lubrication oil is fed from an oil gallery in a wall of the cylinder block through a through hole in a wall of the main bearing into a lubrication oil groove formed along an inner circumferential surface of the main bearing. The lubrication oil is supplied to the lubrication oil groove of the main bearing in this manner, and then supplied to the half thrust bearings.

Meanwhile, in recent years, oil pumps for supplying lubrication oil of internal combustion engines have been reduced in size, so that the amount of lubrication oil to be supplied to the bearings decreases. Accordingly, the amount of lubrication oil leaking through the end surfaces of the main bearing tends to decrease, and the amount of lubrication oil supplied to the half thrust bearings also tends to decrease. To address this, there is proposed an art for improving retainability of lubrication oil by forming a plurality of narrow grooves in parallel on the sliding surfaces of the half thrust bearings, for example (see JP-A-2001-323928).

BRIEF SUMMARY OF THE INVENTION

Further, in recent years, crankshafts have been reduced in diameter for reducing the weight of internal combustion engines, so that the rigidity of the crankshafts becomes low. Accordingly, the crankshaft tends to deform easily during operation of the internal combustion engine, and the vibration of the crankshaft tends to become large. As a result, the sliding surface near a circumferentially central portion of the half thrust bearing tends to directly contact with a thrust collar surface of the crankshaft, so that damage (seizure) easily occurs.

JP-A-2001-323928 discloses a configuration in which the oil grooves are provided on the sliding surface to supply the lubrication oil to almost the entire bearing surface. However, even if adopting the art of JP-A-2001-323928, it is difficult to prevent the sliding surface, particularly adjacent to the thrust relief on a rear side of the half thrust bearing in a crankshaft rotational direction from contacting with the thrust collar of the crankshaft if the vibration of the crankshaft due to the deformation is large as above. Therefore, there has been a possibility that seizure occurs in the sliding surface of the half thrust bearing.

Accordingly, an object of the present invention is to provide a thrust bearing and a bearing device in which the seizure hardly occurs during operation of the internal combustion engine.

According to the present invention, there is provided a thrust bearing (10) for receiving an axial force of a crankshaft of an internal combustion engine which rotates in one direction, the thrust bearing including a pair of half thrust bearings (8, 8) having a semi-annular shape, the pair of half thrust bearings forming an annular shape by abutting respective circumferential end surfaces (83, 83) thereof, wherein the half thrust bearing includes thrust reliefs (82F, 82R) formed adjacent to both circumferential end portions of a sliding surface (81) receiving the axial force so that a wall thickness of the half thrust bearing is thinner toward the circumferential end surface, and a thrust relief length (L2) at an inner end portion of the thrust relief (82R) positioned on a rear side of one of the half thrust bearing in a crankshaft rotational direction is larger than a thrust relief length (L1) at an inner end portion of the thrust relief (82F) positioned on a front side of the other of the half thrust bearings in the crankshaft rotational direction.

Here, the crankshaft is a member including a journal portion, a crankpin portion, and a crank arm portion. While the half thrust bearing is a member having a shape obtained by dividing an annular shape into approximately halves, it is not intended to be strictly half.

The thrust bearing of the present invention is a thrust bearing which is formed in an annular shape by combining a pair of half thrust bearings having a semi-annular shape that receive an axial force of a crankshaft of an internal combustion engine. A thrust relief length of a thrust relief positioned on a rear side in a crankshaft rotational direction is formed so as to be longer than that of a thrust relief positioned on a front side of the half thrust bearing in the rotational direction. By this configuration, lubrication oil flowing out of crush reliefs of a pair of half bearings supporting a journal portion of the crankshaft easily flows into a thrust relief clearance formed by the thrust relief positioned on the rear side in the crankshaft rotational direction and the thrust relief positioned on the front side in the crankshaft rotational direction, and thus a large amount of the lubrication oil is fed to the sliding surface of the thrust bearing. Accordingly, even when the deformation of the crankshaft is generated during the operation of the internal combustion engine and therefore the vibration becomes large, a sliding surface of the thrust bearing hardly comes into direct contact with a thrust collar surface of the crankshaft, so that damage of the sliding surface of the half thrust bearing hardly occurs. Further, According to this configuration, it is possible to maintaining a high load capability since the area of the sliding surface of the thrust bearing is not reduced.

DETAILED DESCRIPTION OF THE INVENTION

Hereinafter, embodiments of the present invention will be described with reference to the drawings.

Embodiment 1

(General Configuration of Bearing Device)

Figure 1:
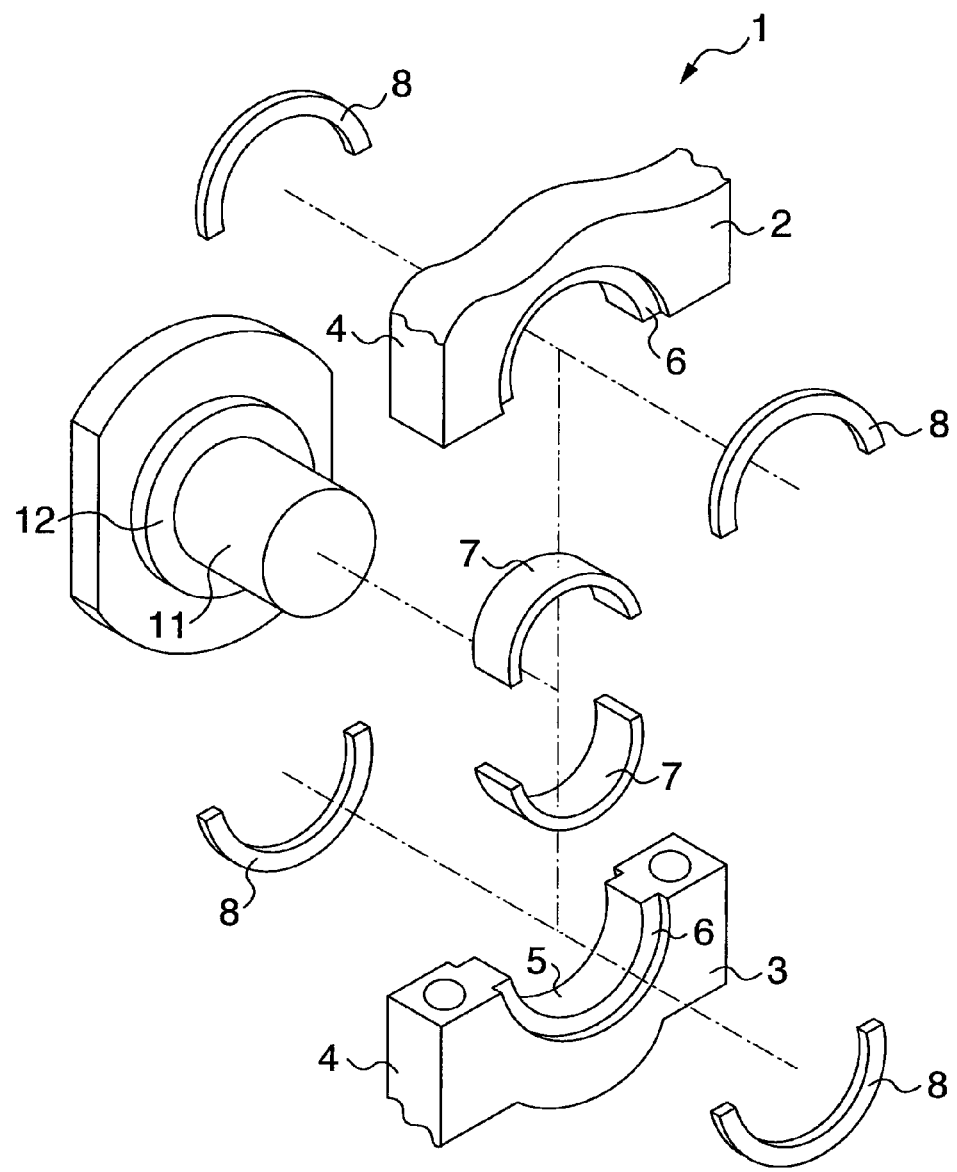
FIG. 1 is an exploded perspective view of a bearing device.
Figure 4:
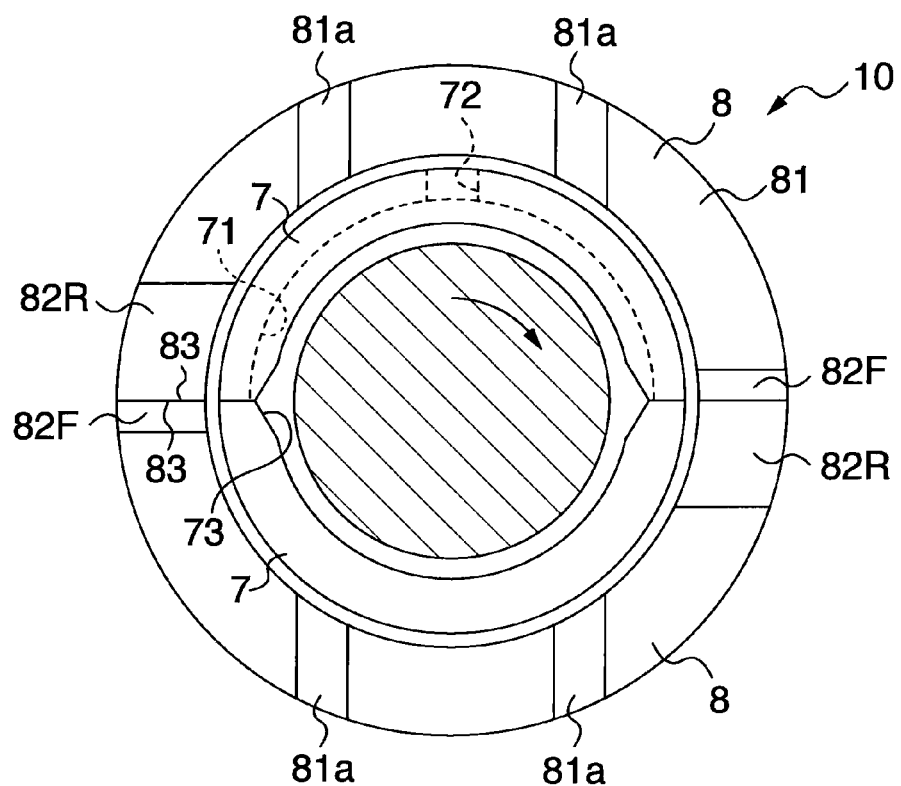
FIG. 4 is a front view of half bearings and the thrust bearing.
Figure 5:
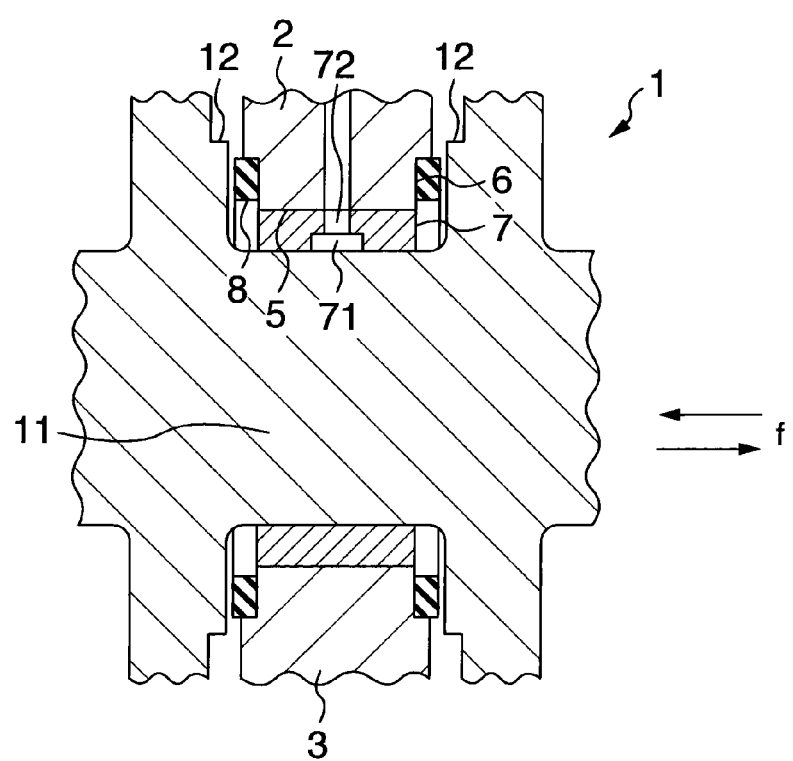
FIG. 5 is a cross-sectional view of the bearing device.

First, a description will be given for a general configuration of a bearing device 1 having a thrust bearing 10 of the present invention, using FIGS. 1, 4, and 5. As shown in FIGS. 1, 4, and 5, a bearing housing 4 configured by attaching a bearing cap 3 to a lower part of a cylinder block 2 has a bearing hole 5 which is a circular hole penetrating between side surfaces of the cylinder block 2 and the bearing cap 3. The side surfaces have seats 6 and 6, which are annular recesses, on the periphery of the bearing hole 5. Half bearings 7 and 7 are assembled in a cylindrical shape and fitted into the bearing hole 5. The half bearings 7 and 7 rotatably support a journal portion 11 of a crankshaft which rotates in one direction. Half thrust bearings 8 and 8 are assembled in an annular shape and fitted into the seats 6 and 6. The half thrust bearings 8 and 8 receive an axial force f (see FIG. 5) via a thrust collar 12 of the crankshaft.

Figure 18:
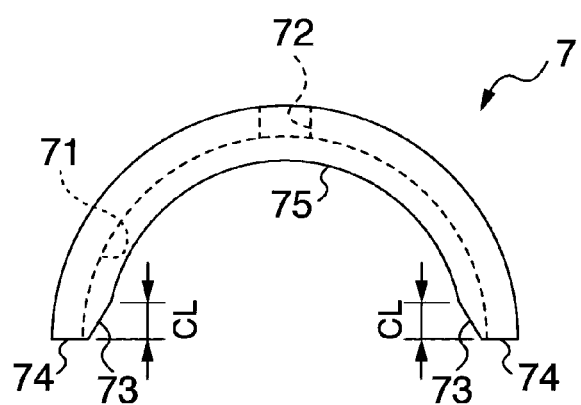
FIG. 18 is a front view of a half bearing of embodiment 5.
Figure 19:
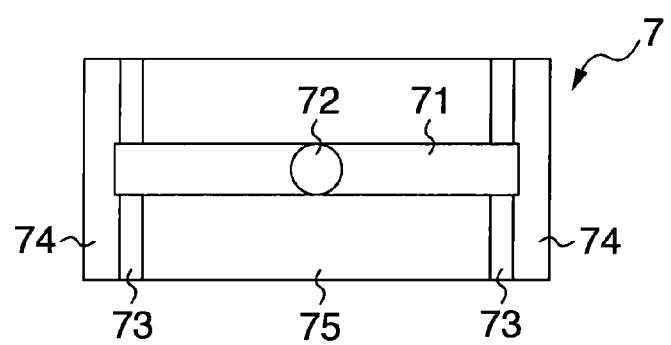
FIG. 19 is a bottom view of the half bearing in FIG. 18 as seen from the inside in a radial direction.

As shown in FIG. 4, a lubrication oil groove 71 is formed on an inner circumferential surface of the half bearing 7 (the upper one) on a side of the cylinder block 2 of the half bearings 7 constituting a main bearing, and a through hole 72 is formed to penetrate the half bearing 7 from the lubrication oil groove 71 to an outer circumferential surface (also see FIGS. 18 and 19). It is to be noted that the lubrication oil groove may be formed on both of the upper and lower half bearings.

Further, each half bearing 7 has crush reliefs 73 and 73 on both ends thereof adjacent to abutment surfaces of the half bearings 7 (see FIG. 4). The crush reliefs 73 are wall-thickness reduction regions formed so that a wall thickness of a region adjacent to circumferential end surfaces of the half bearing 7 is gradually reduced toward the circumferential end surface. The crush reliefs 73 are formed for absorbing misalignment and deformation of abutment surfaces when assembling the pair of half bearings 7 and 7.

(Configuration of Thrust Bearing)

Next, the configuration of the thrust bearing 10 of embodiment 1 will be described with reference to FIGS. 2 to 5. The thrust bearing 10 of embodiment 1 is formed by combining a pair of half thrust bearings 8 in an annular shape. Each half thrust bearing 8 is a semi-annular shaped flat plate formed from a bimetal obtained by bonding a thin bearing alloy layer to a back metal layer. Each half thrust bearing 8 includes a sliding surface 81 (bearing surface) at a central region that is a surface configured by the bearing alloy layer, and thrust reliefs 82R and 82F at regions adjacent to end surfaces 83 and 83 on both circumferential sides of the half thrust bearing 8. In order to improve retainability of the lubrication oil, two oil grooves 81a and 81a are formed between the opposite thrust reliefs 82R and 82F on the sliding surface 81.

The thrust reliefs 82R and 82F are wall-thickness reduction regions formed adjacent to end surfaces of the sliding surface 81 on both circumferential sides so that the wall thickness is gradually reduced toward the end surface of the half thrust bearing 8. The thrust reliefs 82R and 82F are formed over the entire radial length of the circumferential end surfaces 83 of the half thrust bearing 8. The thrust reliefs 82R and 82F are formed to alleviate misalignment between the circumferential end surfaces 83 and 83 of the pair of thrust bearings 8 and 8, that may be caused by misalignment and the like between end surfaces of the respective split type bearing housings 2 and 3 when mounting the half thrust bearings 8 on the split type bearing housing 4.

Figure 11:
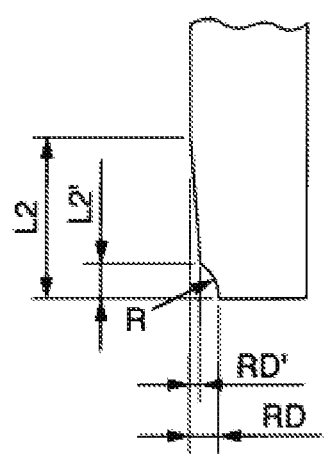
FIG. 11 is a side view of a thrust relief positioned on a rear side of an upper half thrust bearing in FIG. 10 in the crankshaft rotational direction, seen in the direction of arrow Y4.

The surfaces of the thrust reliefs 82R and 82F are configured by flat surfaces in embodiment 1, but may be configured by curved surfaces. In the case of flat surfaces, the surfaces may be configured by a single flat surface, or by combining a plurality of flat surfaces. Also in the case of curved surfaces, the surface may be configured by a single curved surface, or by combining a plurality of curved surfaces. Further, the surface of each thrust reliefs 82R and 82F may be configured by combining a flat surface and a curved surface (FIG. 11).

As will be understood from FIGS. 2 and 4, when the half thrust bearing 8 of the embodiment is mounted on the bearing housing 4 of the bearing device 1, a thrust relief length L2 at an inner end portion of the thrust relief 82R on a side of the circumferential end surface 83 which is assembled so as to be positioned on a rear side in the rotational direction of the crankshaft rotating in one direction (hereinafter, referred to as "rear side thrust relief") is formed to differ from, and longer than a thrust relief length L1 at an inner end portion of the thrust relief 82F on a side of the circumferential end surface 83 positioned on a front side in the crankshaft rotational direction (hereinafter, referred to as "front side thrust relief"). Here, in embodiment 1, the thrust relief length of the rear side thrust relief 82R and the thrust relief length of the front side thrust relief 82F are formed to be constant between the inner end portion and an outer end portion.

Here, the "thrust relief length" means a length measured vertically from a plane (imaginary dividing plane H) passing through both end surfaces 83 and 83 of the one half thrust bearing 8 to the other end of the thrust relief. More specifically, the thrust relief lengths L1 and L2 at the inner end portion are respectively defined as lengths from the imaginary dividing plane H to the points where the surfaces of the thrust reliefs 82F and 82R intersect the inner circumferential edge of the sliding surface 81.

Further, the "thrust relief positioned on a rear side in the crankshaft rotational direction" means the thrust relief 82R of the thrust reliefs at both circumferential end portions of one half thrust bearing 8, that firstly passes through any point on the thrust collar 12 of the rotating crankshaft, and the "thrust relief positioned on a front side in the crankshaft rotational direction" means the thrust relief 82F which secondly passes through the point.

Meanwhile, the crankshaft of an internal combustion engine rotates in one direction during operation. Accordingly, those skilled in the art would recognize which one of the two thrust reliefs adjacent to both circumferential end surfaces of the half thrust bearing is the "thrust relief positioned on a rear side in the crankshaft rotational direction", taking the crankshaft rotational direction into consideration. In addition, those skilled in the art would be able to design and manufacture the thrust bearing 10 of the present invention in accordance with the disclosure of the present invention, and to mount it on a bearing device supporting a crankshaft rotating in one direction.

Figure 2:
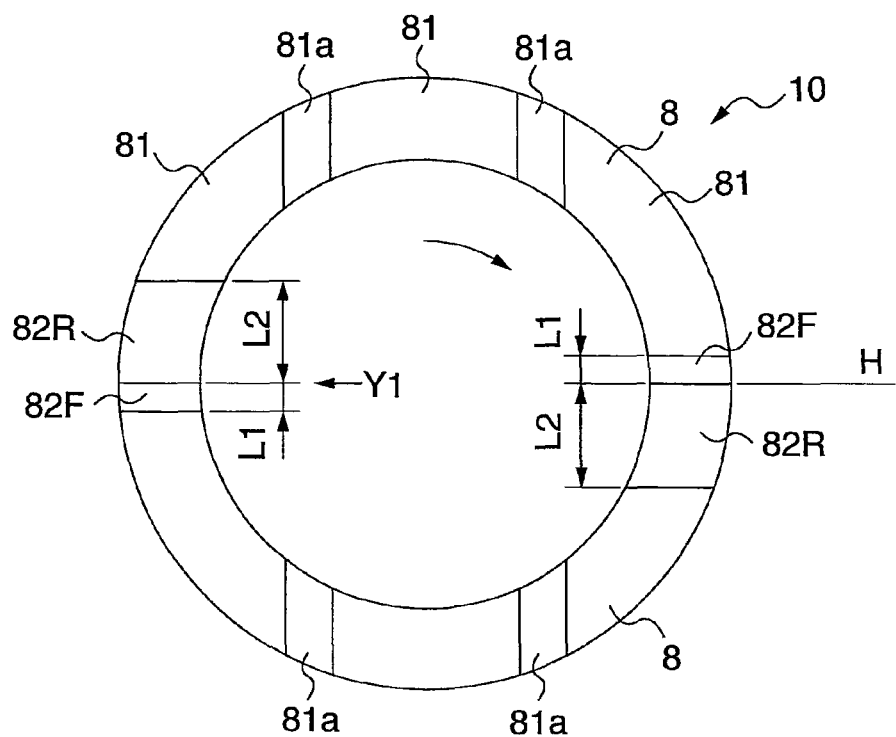
FIG. 2 is a front view of a thrust bearing of embodiment 1.
Figure 3:
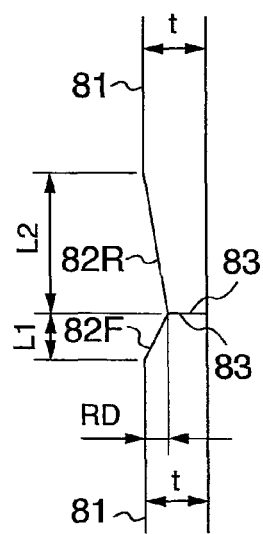
FIG. 3 is a side view of thrust reliefs of the thrust bearing in FIG. 2 seen in the direction of arrow Y1.

FIG. 3 shows a side near the abutment portion of the circumferential end surfaces 83 and 83 of the pair of half thrust bearings 8 seen from the inner side (in the direction of arrow Y1 in FIG. 2). It is to be noted that the abutment portion near the other circumferential end surfaces 83 and 83 of the pair of half thrust bearings 8 on the right side in FIG. 2 also has a configuration similar to that in FIG. 3.

Each half thrust bearing 8 has a constant thickness at the portion of the sliding surface 81, and the pair of half thrust bearings 8 and 8 have the same thickness t at the portion of their sliding surfaces 81 as shown in FIG. 3. The surfaces of the front side thrust relief 82F and the rear side thrust relief 82R of the half thrust bearing 8 have the same thrust relief depth RD (FIG. 3) at the circumferential end surfaces. In embodiment 1, the thrust relief depth RD of the front side thrust relief 82F and the rear side thrust relief 82R at the circumferential end surfaces is constant between the inner end portion and the outer end portion.

Here, the "thrust relief depth" means an axial distance from a plane containing the sliding surface 81 of the half thrust bearing 8 to the surface of the thrust relief. In other words, the thrust relief depth is a distance measured vertically from an imaginary sliding surface obtained by extending the sliding surface 81 over the thrust reliefs 82F and 82R. Hence, the thrust relief depth RD at the circumferential end surface is defined as an axial distance from the surface of the thrust relief at the circumferential end surface of the half thrust bearing 8 to the imaginary sliding surface.

As specific dimensions of the front side thrust relief 82F and the rear side thrust relief 82R, the thrust relief depth RD at the circumferential end surfaces 83 and 83 of the half thrust bearing 8 from the sliding surface 81 to the front side thrust relief 82F and the rear side thrust relief 82R may be 0.3 mm to 1.0 mm, for example, when the thrust bearing is used for a crankshaft of a small internal combustion engine for a passenger car and the like (in which a journal portion diameter is about 30 to 100 mm). It is to be noted that the front side thrust relief 82F and the rear side thrust relief 82R have the same thrust relief depth RD. The thrust relief length L1 of the front side thrust relief 82F at the inner end portion may be 1 mm to 5 mm, and the thrust relief length L2 of the rear side thrust relief 82R at the inner end portion may be 5 mm to 25 mm. It is to be noted that the above dimensions are merely examples, and the dimensions are not limited to these ranges.

The foregoing numerical ranges of the thrust relief length L1 of the front side thrust relief 82F and the thrust relief length L2 of the rear side thrust relief 82R are partially overlapped with each other. However, this is because the larger the bearing is, the longer the thrust relief length needs to be. Accordingly, the thrust relief lengths L1 and L2 should satisfy the relation L2>L1 within their respective numerical ranges.

Figure 7:
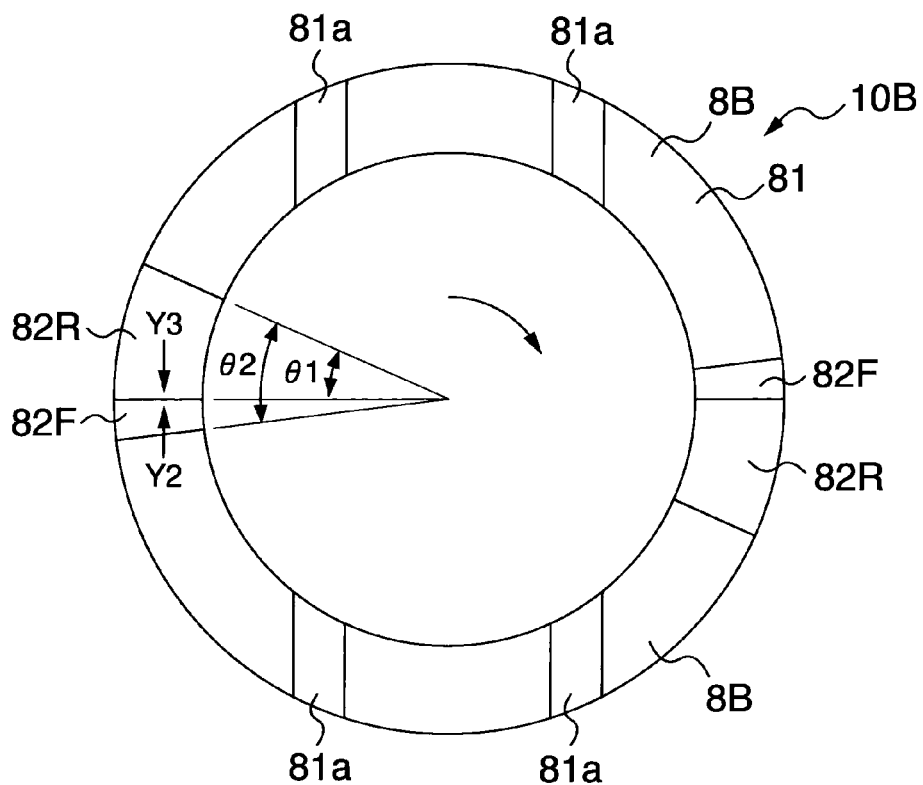
FIG. 7 is a front view of a thrust bearing of embodiment 3.

In addition, as shown in FIG. 7, the rear side thrust relief is preferably formed within a range of a circumferential angle θ1 of 25° or less from the circumferential end surface 83 of the half thrust bearing 8, and a pair of the rear side thrust relief and the front side thrust relief is preferably formed within a range of a circumferential angle θ2 of 30° or less.

(Operation)

Next, the operation of the thrust bearing 10 of the embodiment will be described, using FIGS. 4, 5, 17A, and 17B.

(Oil Supply Operation)

In the bearing device 1, the lubrication oil discharged by pressurized from an oil pump (not shown) passes an internal oil passage of the cylinder block 2 and the through hole 72 penetrating the wall of the half bearing 7, and is supplied to the lubrication oil groove 71 on the inner circumferential surface of the half bearing 7. The lubrication oil supplied into the lubrication oil groove 71 is partly supplied to the inner circumferential surface of the half bearing 7, partly fed through an opening (not shown) for an internal oil passage of the crankshaft provided on a surface of the journal portion toward a crankpin, and further, partly passes through a clearance between the surface of the crush reliefs 73 of the pair of half bearings 7 and 7 forming the main bearing and the surface of the journal portion 11 of the crankshaft to flow from both axial ends of the half bearings 7 and 7 to the outside.

In the embodiment, the half bearings 7 are arranged concentrically with the half thrust bearings 8, and a plane containing both circumferential end surfaces of the half bearings 7 constituting the main bearing is made parallel to a plane containing both circumferential end surfaces of the half thrust bearings 8, so that the positions of the crush reliefs 73 correspond to those of the thrust reliefs 82F and 82R.

Hereinafter, the operation of the present invention will be described.

Figure 17A:
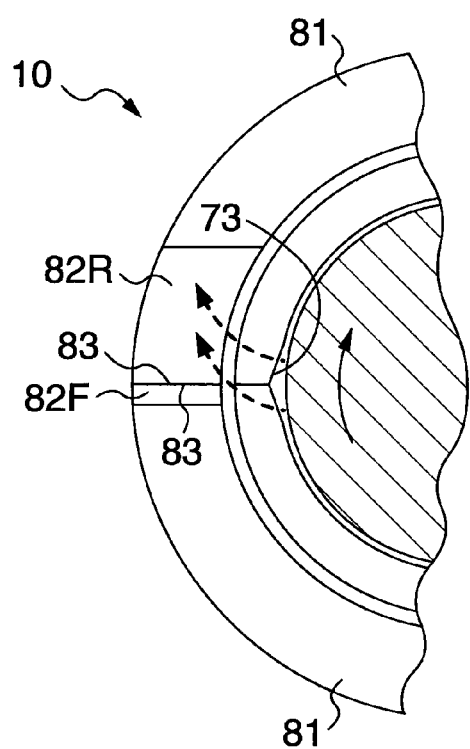
FIG. 17A is a front view of half bearings and a thrust bearing for explaining operation of the embodiment.
Figure 17B:
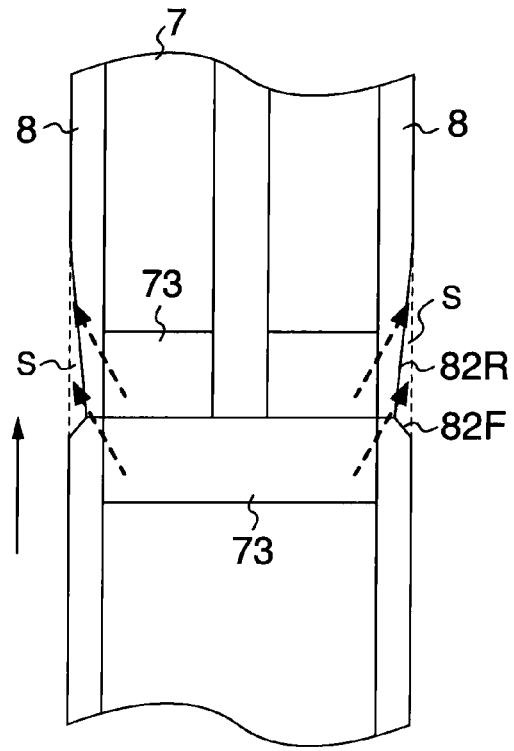
FIG. 17B is a view showing an inner side of the half bearings and the thrust bearing in FIG. 17A as seen from the inside in a radial direction.

Immediately after flowing out of the clearance between the crush reliefs of the half bearings 7, the lubrication oil flows toward a front side in the crankshaft rotational direction from the position of the abutment portion (joint portion) of a circumferential end surface of one half thrust bearing 8 and that of the other half thrust bearing 8 as shown in FIGS. 17A and 17B (dashed arrow) due to an inertial force causing the oil to move on the front side in the rotational direction of the crankshaft 11 because the lubrication oil has circumferentially flown with the surface of the journal portion of the rotating crankshaft.

The thrust bearing 10 of the embodiment includes the pair of half thrust bearings 8 and 8, and the thrust relief length L2 of the rear side thrust relief 82R of each half thrust bearing 8 is longer than the thrust relief length L1 of the front side thrust relief 82F. According to the configuration, the center of the length at the inner end portion of a thrust relief clearance S surrounded by the surface of the front side thrust relief 82F of one half thrust bearing 8, the surface of the rear side thrust relief 82R of the other half thrust bearing 8, and the imaginary sliding surface obtained by extending the sliding surface 81 over the surfaces of the front side thrust relief 82F and the rear side thrust relief 82R (see FIG. 17B) is positioned on a front side in the rotational direction of the crankshaft 11 relative to the abutment portion (joint portion) of the circumferential end surface 83 of one half thrust bearing 8 and that of the other half thrust bearing 8. Accordingly, the lubrication oil flown out of the crush relief clearance of the half bearings 7 and then flowing on the front side in the rotational direction of the crankshaft 11 relative to the position of the abutment portion (joint portion) of the circumferential end surfaces 83 and 83 of the pair of half thrust bearings 8 flows into the thrust relief clearance S in large amounts, and is then fed to the sliding surface 81.

During the operation of the internal combustion engine, the deformation of the crankshaft (deflection in the axial direction) occurs especially under the operation condition in which the crankshaft is rotated at high speeds, and thereby the vibration of the crankshaft becomes large. The large vibration periodically causes an axial force f in the crankshaft toward the sliding surface 81 of the thrust bearing 10. The sliding surface 81 of the thrust bearing 10 receives the axial force f.

In the thrust bearing 10 of the present invention, even under the axial force f of the crankshaft, the lubrication oil flown out of the crush relief clearance between the pair of half bearings 7 easily flows into the thrust relief clearance S in large amounts that is formed by the thrust relief 82F positioned on a front side in the rotational direction and the thrust relief 82R positioned on a rear side in the rotational direction in the thrust bearing 10, and this large amount of lubrication oil is fed to the sliding surface 81 as described above. Since the large amount of lubrication oil is supplied, the sliding surface 81 of the thrust bearing 10 hardly comes into direct contact with the surface of the thrust collar 12 of the crankshaft.

In the pair of half thrust bearings 8 constituting the thrust bearing 10 of the embodiment, the thrust relief length L2 of the rear side thrust relief 82R is longer than the thrust relief length L1 of the front side thrust relief 82F. When comparing the configuration of the embodiment with the configuration of a conventional thrust bearing in which thrust reliefs with the same length are formed at both circumferential end portions, the center of the length at a radially inner end portion of the thrust relief clearance formed by the thrust reliefs with the same length between the pair of half thrust bearings constituting the conventional thrust bearing is positioned at an abutment portion (joint portion) of circumferential end surfaces of the pair of half thrust bearings, while the center of the length at the radially inner end portion of the thrust relief clearance S in the configuration of the embodiment is shifted on a front side in the crankshaft rotational direction relative to the abutment portion (joint portion) of the circumferential end surfaces without reducing the area of the sliding surface 81. Accordingly, the thrust bearing 10 of the present invention still maintains a high ability of receiving (bearing) the axial load of the crankshaft. In contrast, in the case of the conventional thrust bearing, if the lengths of the thrust reliefs on both circumferential sides of the half thrust bearing are increased for increasing the amount of lubrication oil flowing out of the crush relief clearance of the main bearing (half bearings), the area of the sliding surface of the thrust bearing has to be reduced, and accordingly the ability of the thrust bearing of receiving the axial load of the crankshaft is decreased.

Additionally, in the pair of half thrust bearings 8 and 8 constituting the thrust bearing 10 of the embodiment, the thrust relief depths RD of the front side thrust relief 82F and the rear side thrust relief 82R are maximum and have the corresponding thickness at the circumferential end surfaces so as to correspond to each other (so as not to cause a step) over the entire length in the radial direction. Accordingly, the original effect of the thrust relief of alleviating the misalignment between the circumferential end surfaces 83 and 83 of the pair of half thrust bearings 8 and 8, which effect is caused by the misalignment or the like of the end surfaces of the split type bearing housings 2 and 3 when assembling the pair of half thrust bearings 8 and 8 into the split type bearing housing 4, is not affected.

Embodiment 2

Hereinafter, a description will be given, using FIG. 6, for a thrust bearing 10A constituted by a pair of half thrust bearings 8A each having a front side thrust relief 82F and a rear side thrust relief 82R which are another than those in embodiment 1. The parts identical or equal to those in embodiment 1 will be described with the same reference characters.

(Configuration)

The configuration will be described first. The configuration of the thrust bearing 10A according to the embodiment is generally similar to that in embodiment 1 except for the shapes of the front side thrust relief 82F and the rear side thrust relief 82R of the pair of half thrust bearings 8A constituting the thrust bearing 10A.

Figure 6:
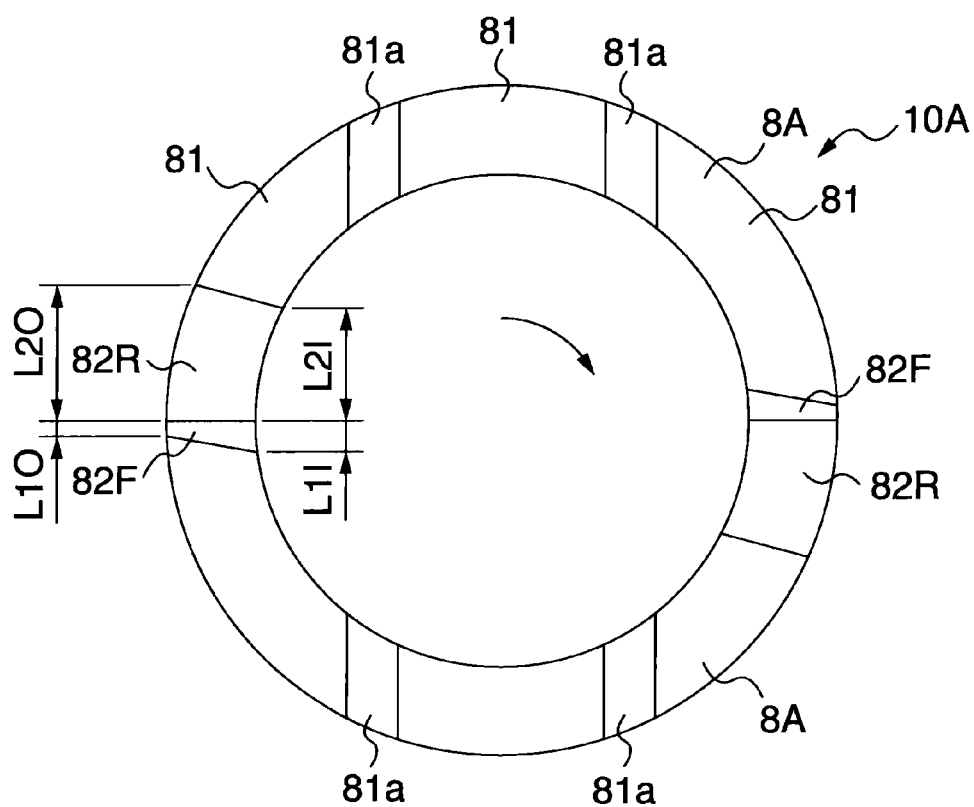
FIG. 6 is a front view of a thrust bearing of embodiment 2.

Specifically, a surface of the rear side thrust relief 82R of the half thrust bearing 8A of the embodiment is constituted by a flat surface, and as shown in FIG. 6, a thrust relief length L2 is configured so as to be minimum (L2I) at the radially inner end portion and maximum (L2O) at the radially outer end portion. A surface of the front side thrust relief 82F is also constituted by a flat surface, and as shown in FIG. 6, a thrust relief length L1 is configured so as to be maximum (L1I) at the radially inner end portion and minimum (L1O) at the radially outer end portion.

On the other hand, other relations such as the relation between the thrust relief lengths L1I and L2I at the inner end portion and the relation between the thrust relief depths RD of the front side thrust relief and the rear side thrust relief are similar to those in embodiment 1.

The other configurations of embodiment 2 are generally similar to those in embodiment 1 and therefore, embodiment 2 has operations and effects similar to those in embodiment 1.

Embodiment 3

Hereinafter, a description will be given, using FIGS. 7 to 9, for a thrust bearing 10B constituted by a pair of half thrust bearings 8B each having a front side thrust relief 82F and a rear side thrust relief 82R which are another than those in embodiments 1 and 2. The parts identical or equal to those in embodiments 1 and 2 will be described with the same reference characters.

(Configuration)

The configuration will be described first. The configuration of the thrust bearing 10B according to embodiment 3 is generally similar to that in embodiment 1 except for the shapes of the front side thrust relief 82F and the rear side thrust relief 82R of the pair of half thrust bearings 8B constituting the thrust bearing 10B.

Specifically, a surface of the rear side thrust relief 82R of each half thrust bearing 8B of the embodiment is constituted by a flat surface, and as shown in FIG. 7, a thrust relief length L2 is configured so as to be minimum at the radially inner end portion and maximum at the radially outer end portion. A surface of the front side thrust relief 82F is also constituted by a flat surface, and as shown in FIG. 7, a surface of thrust relief length is configured so as to be minimum at the radially inner end portion and maximum at the radially outer end portion.

Figure 8:
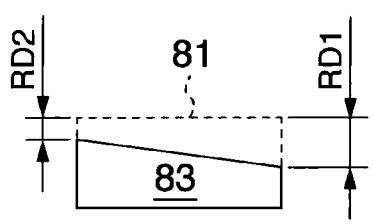
FIG. 8 is an end view of an upper half thrust bearing in FIG. 7 seen in the direction of arrow Y2, illustrating a circumferential end surface of a thrust relief positioned on a rear side in a crankshaft rotational direction.
Figure 9:
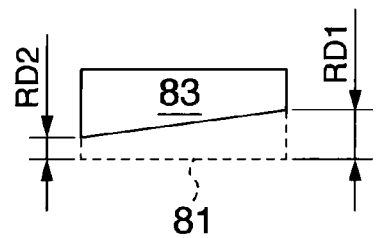
FIG. 9 is an end view of a lower half thrust bearing in FIG. 7 seen in the direction of arrow Y3, illustrating a circumferential end surface of a thrust relief positioned on a front side in the crankshaft rotational direction.

FIG. 8 shows the circumferential end surface 83 of the upper half thrust bearing 8B positioned on a rear side in the crankshaft rotational direction, seen in the direction of arrow Y2 in FIG. 7, and FIG. 9 shows the circumferential end surface 83 of the lower half thrust bearing 8B positioned on a front side in the crankshaft rotational direction, seen in the direction of arrow Y3 in FIG. 7. As shown in FIGS. 8 and 9, in the half thrust bearing 8B of the embodiment, unlike embodiments 1 and 2, the rear side thrust relief 82R and the front side thrust relief 82F have the thrust relief depths RD measured from the sliding surface 81 that are maximum (RD1) at the inner end portions and minimum (RD2) at the outer end portions, at the circumferential end surfaces 83 and 83. Also in this case, the thrust relief depths RD of the front side thrust relief 82F and the rear side thrust relief 82R correspond to each other over the entire radial length of the circumferential end surfaces 83. It is to be noted that the front side thrust relief 82F of the upper thrust bearing 8B and the rear side thrust relief 82R of the lower half thrust bearing 8B shown in FIG. 7 are also configured in the same manner.

As specific dimensions of the thrust reliefs 82R and 82F, the thrust relief depths RD1 at the inner end portions and the thrust relief lengths L1 and L2 of the thrust reliefs 82R and 82F are similar to those in embodiment 1, while the thrust relief depths RD2 at the outer end portions may be 0.15 to 0.5 mm when used for a crankshaft (in which a journal portion diameter is about 30 to 100 mm) of a small internal combustion engine for a passenger car and the like. The above dimensions are, however, merely examples, and the dimensions are not limited to these ranges.

In embodiment 3, the lubrication oil having flown into the thrust reliefs 82R and 82F hardly flows to the outside through the radially outer end portions of the thrust reliefs 82R and 82F, and becomes easily supplied to the sliding surface. The other configurations are generally similar to those in embodiment 1 and therefore embodiment 3 has operations and effects similar to those in embodiment 1.

Embodiment 4

Hereinafter, a description will be given, using FIGS. 10 to 12, for a thrust bearing 10C constituted by a pair of half thrust bearings 8C each having a front side thrust relief 82F and a rear side thrust relief 82R which are another than those in embodiments 1-3. The parts identical or equal to those in embodiments 1-3 will be described with the same reference characters.

(Configuration)

The configuration will be described first. The configuration of the thrust bearing 10C according to the embodiment is generally similar to that in embodiment 1 except for the shapes of the front side thrust relief 82F and the rear side thrust relief 82R of the pair of half thrust bearings 8C constituting the thrust bearing 10C.

Figure 10:
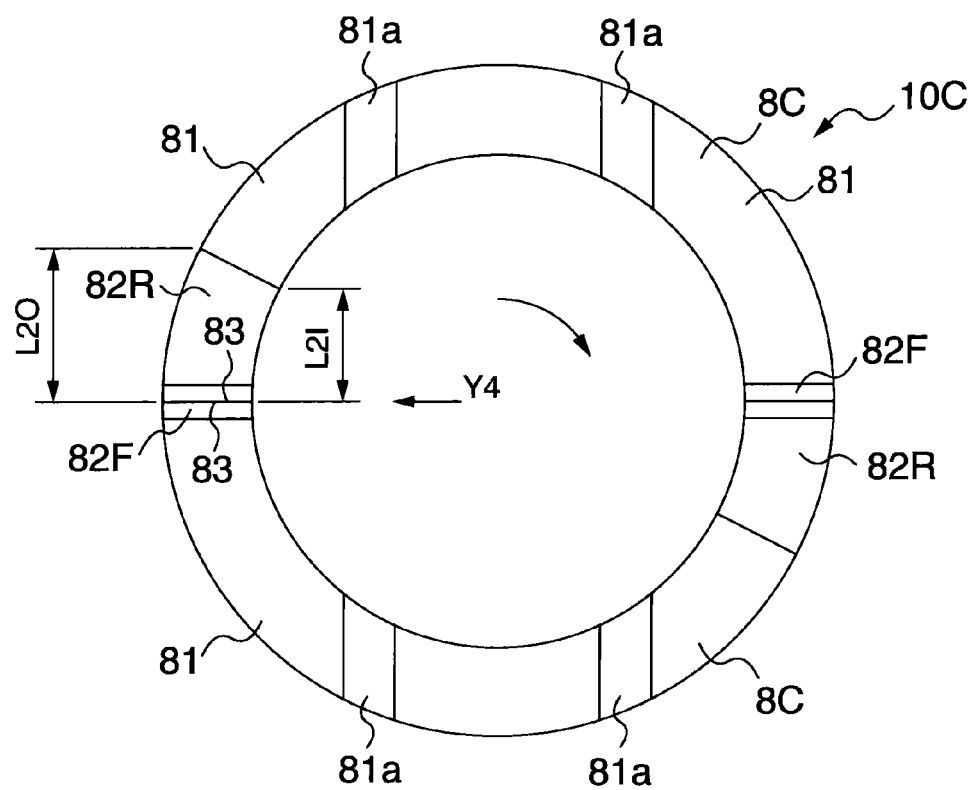
FIG. 10 is a front view of a thrust bearing of embodiment 4.
Figure 12:
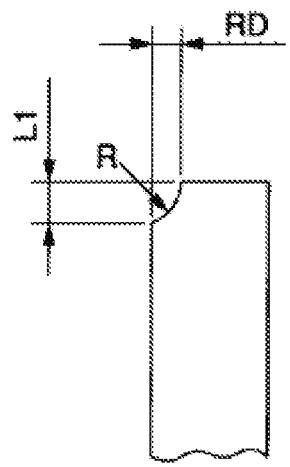
FIG. 12 is a side view of a thrust relief positioned on a front side of a lower half thrust bearing in FIG. 10 in the crankshaft rotational direction, seen in the direction of arrow Y4.

FIG. 11 shows a side view of an area near the circumferential end surface 83 of the half thrust bearing 8C positioned on a rear side in the crankshaft rotational direction, seen from the inside (in the direction of arrow Y4 in FIG. 10), and FIG. 12 shows a side view of an area near the circumferential end surface 83 of the half thrust bearing 8C positioned on a front side in the crankshaft rotational direction, seen from the inside (in the direction of arrow Y4 in FIG. 10).

As shown in FIG. 10, in the half thrust bearing 8C of embodiment 4, a surface of the rear side thrust relief 82R is configured by a flat surface adjacent to the sliding surface 81 and a curved surface (arc-shaped surface) which is adjacent to the circumferential end surface 83 of the half thrust bearing 8C and is depressed from the sliding surface 81 toward an opposite surface (back face) to be a concave shape, and a thrust relief length L2 is configured so as to be minimum (L2I) at the inner end portion and becomes longer toward the outer end portion.

A surface of the front side thrust relief 82F is configured by a curved surface (arc-shaped surface) depressed from the sliding surface 81 toward the opposite surface (back face) to be a concave shape, and a thrust relief length L1 is configured so as to be constant between the inner end portion and the outer end portion as shown in FIG. 10.

The relation between the thrust relief length L2 of the rear side thrust relief 82R and the thrust relief length L1 of the front side thrust relief 82F at the inner end portions are similar to that in embodiment 1.

A thrust relief depth RD of the front side thrust relief 82F at the circumferential end surface 83 and a thrust relief depth RD of the rear side thrust relief 82R at the circumferential end surface 83 are constant over the radial entire length of the thrust reliefs, and are made to correspond to each other. The front side thrust relief 82F and the rear side thrust relief 82R shown on the right side in FIG. 10 are also configured in the same manner.

A length L2' of the curved surface portion of the rear side thrust relief 82R shown in FIG. 11 (a length measured vertically from a plane containing the circumferential end surface 83 of the half thrust bearing 8C) is generally the same as a thrust relief length L1 of the front side thrust relief 82F shown in FIG. 12, and constant between the inner diameter end portion and the outer diameter end portion. The length L2' of the curved surface portion of the rear side thrust relief 82R at the inner end portion may be 0.5 to 3.5 mm.

The curved surface portion of the rear side thrust relief 82R is formed so that a depth RD' from the sliding surface 81 to a position where the curved surface portion is connected to the flat surface portion is constant over the entire radial length of the thrust relief. The depth RD' of the curved surface portion of the rear side thrust relief 82R from the sliding surface 81 to a position where the curved surface portion is connected to the flat surface portion is preferably 0.005 mm to 0.1 mm.

As shown in FIGS. 11 and 12, the curved surface portion of the rear side thrust relief 82R and the curved surface of the front side thrust relief 82F may be an arc-shaped surface having the same radius of curvature R. However, the curved surface portion of the rear side thrust relief 82R and the curved surface of the front side thrust relief 82F are not limited to this, and may be an elliptical arc surface or a free curved surface (free-form surface).

The length L2' of the curved surface portion of the rear side thrust relief 82R is not limited to the embodiment, and may be configured so that the length of the curved surface portion becomes longer or shorter from the inner end portion toward the outer end portion of the half thrust bearing.

Figure 13A:
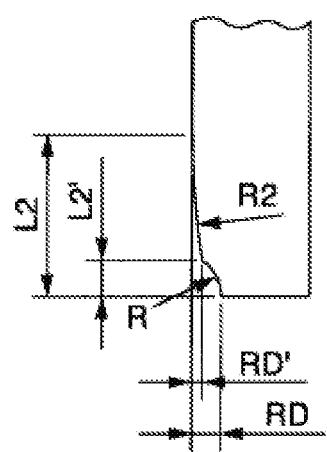
FIG. 13A is a side view of a thrust relief positioned on a rear side of a half thrust bearing in the crankshaft rotational direction of another embodiment.

Also, the flat surface portion of the rear side thrust relief 82R shown in FIG. 11 close to the sliding surface 81 may be changed to a curved surface having a radius of curvature R2 and bulging from the back face side toward the sliding surface 81 side to be a convex shape, as shown in FIG. 13A. Although FIG. 13A shows a curved surface having the radius of curvature R2, it would be understood that the curved surface portion is not limited to this and may have an elliptical arc surface or a free curved surface.

Figure 13B:
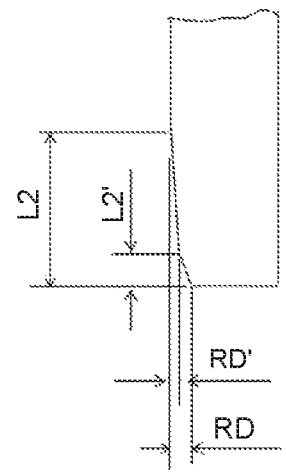
FIG. 13B is a side view of a thrust relief positioned on a rear side of a half thrust bearing in the crankshaft rotational direction of an additional embodiment.

Similarly, the curved surface portion of the rear side thrust relief 82R shown in FIG. 11 or 13 adjacent to the circumferential end surface 83 may be changed to a flat surface (FIG. 13B). Further, the curved surface portion or the flat surface portion of the rear side thrust relief 82R adjacent to the circumferential end surface 83 may be configured so that a depth RD' measured from the sliding surface 81 at the position where the curved surface portion or the flat surface portion is connected to the curved surface portion or the flat surface portion close to the sliding surface 81 becomes deeper or shallower from the inner end portion toward the outer end portion of the half thrust bearing 8C.

The surface of the front side thrust relief 82F is preferably configured similarly to the curved surface portion or the flat surface portion of the rear side thrust relief 82R adjacent to the circumferential end surface 83.

Embodiment 5

Next, the bearing device 1 equipped with the thrust bearing of the present invention will be described using FIGS. 2 to 5, 18, and 19. The parts identical or equal to those in the foregoing embodiments will be described with the same reference characters.

In the embodiment, a description will be given for the bearing device 1 equipped with the thrust bearing 10 described in embodiment 1, although the bearing device is not limited to this. It should be noted that the bearing device 1 with any of the thrust bearings 10A to 10C of embodiments 2-4 also has an operation and an effect similar to that below.

As shown in FIGS. 4 and 5, the bearing device 1 of the embodiment includes the bearing housing 4 having the cylinder block 2 and the bearing cap 3, two half bearings 7 and 7 for rotatably supporting the journal portion 11 of the crankshaft, and two thrust bearings 10 (four half thrust bearings 8) for receiving the axial force via the thrust collar 12 of the crankshaft.

The cylinder block 2 and the bearing cap 3 constituting the bearing housing 4 have a bearing hole 5 penetrating therethrough at their joint portion as a retaining hole for retaining the pair of half bearings 7 and 7.

Each half bearing 7 has crush reliefs 73 and 73 at both circumferential end portions on its inner circumferential surface. As shown in FIGS. 18 and 19, the half bearing 7 placed on a cylinder block 2 side includes a lubrication oil groove 71 formed along the circumferential direction and near the center portion in a width direction (axial direction), and a through hole 72 penetrating the half bearing 7 to extend from the lubrication oil groove 71 on the inner circumferential surface to its outer circumferential surface.

Axially opposite sides of the pair of half bearings 7 and 7 are each provided with the thrust bearing 10 constituted by the pair of half thrust bearings 8 and 8. Each half thrust bearing 8 is formed in a semi-annular shape. The half bearing 7 and the half thrust bearing 8 are placed such that their outer diameters are approximately concentric to each other and a horizontal plane passing through both circumferential end surfaces of the half bearing 7 and a horizontal plane passing through both circumferential end surfaces of the half thrust bearing 8 are approximately parallel to each other.

As a result, the crush relief 73 of the half bearing 7 and the thrust reliefs 82 of the half thrust bearing 8 correspond one-to-one to each other as shown in FIG. 4.

As described in embodiment 1, in the half thrust bearing 8, the thrust relief length L2 of the rear side thrust relief 82R at the inner end portion is longer than the thrust relief length L1 of the front side thrust relief 82F at the inner end portion.

Accordingly, in the embodiment, as shown in FIG. 4, the center position of the length at the inner end portion of the thrust relief clearance S formed by the front side thrust reliefs 82F and the rear side thrust reliefs 82R at the abutment portion of both circumferential ends of the pair of half thrust bearings 8 (namely, the clearance surrounded by the surface of the front side thrust relief 82F, the surface of the rear side thrust relief 82R, and the imaginary extended surface of the sliding surface 81, seen from the inside of the thrust bearing 10 in the radial direction) is shifted on a front side in the crankshaft rotational direction relative to the center position of the corresponding crush relief clearance surrounded by the surfaces of the crush reliefs 73 of the pair of half bearings 7 and the imaginary extended surface of an inner circumferential surface 75 of the half bearing 7.

In addition to the relation between the thrust relief length L1 and the thrust relief length L2, the pair of half thrust bearings 8 constituting the thrust bearing 10 of the embodiment has the following relation to the half bearing 7.

That is to say, in the half thrust bearing 8 of the embodiment, the thrust relief length L2 of the rear side thrust relief 82R at the inner end portion is longer than the crush relief length CL of the crush relief 73 of the corresponding half bearing 7.

In addition, in the half thrust bearing 8 of the embodiment, the thrust relief length L1 of the front side thrust relief 82F at the inner end portion is shorter than the crush relief length CL (FIG. 18) of the crush relief 73 of the corresponding half bearing 7.

Here, the "crush relief length CL" of the crush relief 73 means a length of the crush relief 73 disposed correspondingly to the position of the rear side thrust relief 82R or the position of the front side thrust relief 82F at the axial end portion on the side where the half thrust bearing 8 is provided (FIG. 4). In particular, the crush relief length CL is expressed by, when the half bearing 7 is placed on a horizontal surface such that both circumferential end surfaces 74 and 74 become a lower end surface, a height from the horizontal surface to an upper edge of the crush relief 73 (FIG. 18). It is to be noted that the crush reliefs 73 at both circumferential end portions of the half bearing 7 have the same crush relief length. Alternatively, unlike the embodiment, the crush relief length of the crush reliefs 73 of the half bearing 7 may be varied in the axil direction of the half bearing 7.

Hereinafter, the operation of the present invention will be described.

Immediately after flowing out of the clearance between the crush reliefs of the half bearings 7, the lubrication oil flows on a front side in the crankshaft rotational direction from the position of the abutment portion (joint portion) of a circumferential end surface of one half thrust bearing 8 and that of the other half thrust bearing 8 as shown in FIGS. 17A and 17B (dashed arrow) due to an inertial force which causes the oil to move toward a front side in the rotational direction of the crankshaft 11 because the lubrication oil has circumferentially flown with the surface of the journal portion of the rotating crankshaft.

The thrust bearing 10 of the bearing device 1 according to the embodiment includes the pair of half thrust bearings 8 and 8, and the thrust relief length L2 of the rear side thrust relief 82R of each half thrust bearing 8 is longer than the thrust relief length L1 of the front side thrust relief 82F. Further, in the half thrust bearing 8, the thrust relief length L2 of the rear side thrust relief 82R at the inner end portion is longer than the crush relief length CL of the crush relief 73 of the corresponding half bearing 7, and the thrust relief length L1 of the front side thrust relief 82F at the inner end portion is shorter than the crush relief length CL of the crush relief 73 of the corresponding half bearing 7. According to the configuration, the center of the length at the inner end portion of a thrust relief clearance S surrounded by the surface of the front side thrust relief 82F of one half thrust bearing 8, the surface of the rear side thrust relief 82R of the other half thrust bearing 8, and the imaginary sliding surface obtained by extending the sliding surface 81 over the surfaces of the front side thrust relief 82F and the rear side thrust relief 82R (see FIG. 17B) is positioned on a front side in the rotational direction of the crankshaft 11 relative to the abutment portion (joint portion) of the circumferential end surface 83 of one half thrust bearing 8 and that of the other half thrust bearing 8. Accordingly, the lubrication oil flown out of the crush relief clearance of the half bearings 7 and flowing toward a front side in the rotational direction of the crankshaft 11 from the position of the abutment portion (joint portion) of the circumferential end surfaces 83 and 83 of the pair of half thrust bearings 8 flows into the thrust relief clearance S in large amounts, and thus the large amount of lubrication oil can be fed to the sliding surface 81.

During the operation of the internal combustion engine, the deformation of the crankshaft (in the axial direction) occurs especially under the operation condition in which the crankshaft is rotated at high speeds, and therefore the vibration of the crankshaft becomes large. The large vibration periodically generates the axial force f in the crankshaft toward the sliding surface 81 of the thrust bearing 10. The sliding surface 81 of the thrust bearing 10 receives the axial force f.

In the thrust bearing 10 of the bearing device 1 according to the present invention, even under the axial force f of the crankshaft, the lubrication oil flowing out from the crush relief clearance between the pair of half bearings 7 easily flows in large amounts into the thrust relief clearance S formed by the thrust relief 82F positioned on a front side in the rotational direction and the thrust relief 82R positioned on a rear side in the rotational direction in the thrust bearing 10, and the large amount of lubrication oil is fed to the sliding surface 81 as described above. Because the large amount of lubrication oil is supplied, the sliding surface 81 of the thrust bearing 10 hardly comes into direct contact with the surface of the thrust collar 12 of the crankshaft. Also, the thrust bearing 10 of the bearing device 1 according to the present invention still has a high ability of receiving (bearing) the axial load of the crankshaft since the area of the sliding surface 81 is not reduced.

As specific dimensions of the crush relief 73 of the half bearing 7, a depth of the crush relief 73 at the end surface 74 measured from an imaginary extended surface obtained by extending the sliding surface 75 over the crush relief is 0.01 to 0.1 mm, and the crush relief length CL is 3 to 7 mm when used for a crankshaft (in which a journal portion diameter is about 30 to 100 mm) of a small internal combustion engine for a passenger car, for example.

Also, the thrust relief length L2 of the rear side thrust relief 82R of the half thrust bearing 8 at the inner end portion preferably satisfies the formula: $L2 \geq 1.5 \times CL$ with respect to the crush relief length CL of the crush relief of the correspondingly positioned half bearing 7. Further, the thrust relief length L1 of the front side thrust relief 82F of the half thrust bearing 8 at the inner end portion preferably satisfies the formula: $L1 \leq 1.5 \times CL$ with respect to the crush relief length CL of the crush relief 73 of the correspondingly positioned half bearing 7.

In the embodiment, the description has been given for the bearing device 1 using such a type of thrust bearing 10 that the half bearing 7 and the half thrust bearing 8 are separated from each other, however, the present invention is not limited to this. The present invention also encompasses a bearing device 1 using such a type of thrust bearing 10 that the half bearing 7 and the half thrust bearing 8 are integrated.

Embodiments 1-5 of the present invention has been described in detail above with reference to the drawings, however, the specific configurations are not limited to these embodiments, and the present invention includes design modifications which do not depart from the gist of the present invention.

Figure 14:
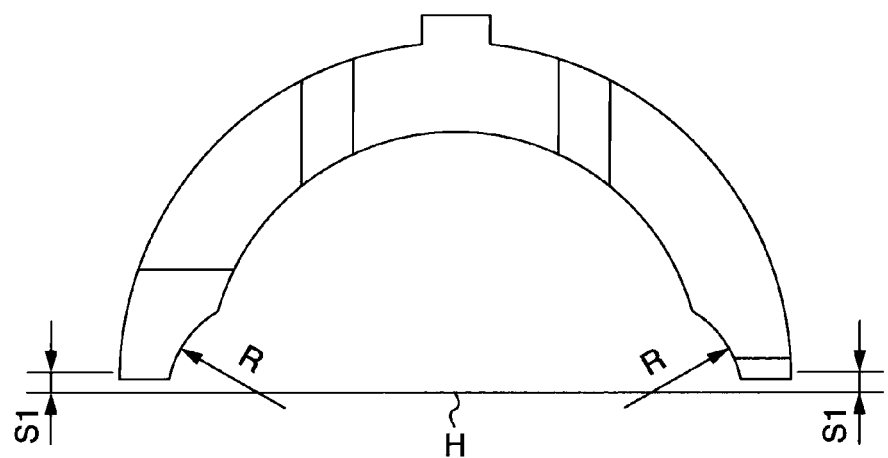
FIG. 14 is a front view of a half thrust bearing of another embodiment.

For example, as shown in FIG. 14, the present invention may be applied to a thrust bearing using a half thrust bearing with a protrusion protruding radially outwardly for positioning and rotation prevention. Also, the circumferential length of the half thrust bearing may be shorter than that of the half thrust bearing 8 shown in embodiment 1, for example, by a predetermined length S1. Also, the half thrust bearing 8 may have an arcuate cutout having a radius R on its inner circumferential surface close to the circumferential end surfaces.

When forming the arcuate cutout with the radius R in this manner, the thrust relief lengths L1 and L2 and the thrust relief depths RD of the thrust reliefs 82F and 82R can be expressed by the lengths with reference to extension lines of upper edges of the thrust reliefs 82F and 82R and the depths with reference to extension surfaces of surfaces of the thrust reliefs 82F and 82R, respectively, that are obtained when the arcuate cutout is not formed.

Similarly, the half thrust bearing 8 may have chamfers along the circumferential direction at the radial outer or inner edge on the sliding surface side. In that case, the thrust relief lengths and the thrust relief depths at the inner end portion and the outer end portion can be expressed by thrust relief lengths and thrust relief depths at positions of inner and outer diameter side end portions of the half thrust bearing, that would exist when the chamfers is not formed.

Figure 15:
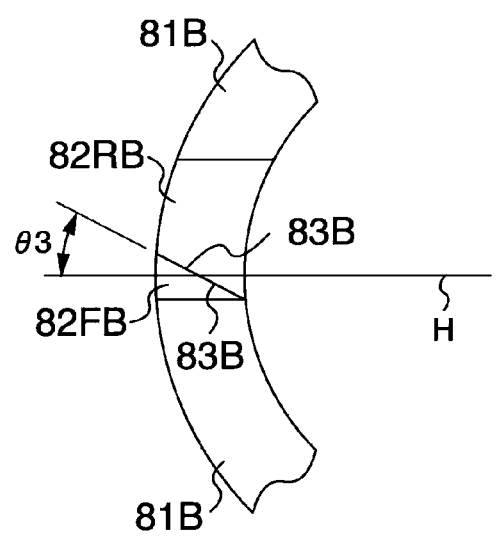
FIG. 15 is a front view of thrust reliefs of another embodiment.

Also, in order to prevent misassemble, at only one of two abutment portions of a pair of half thrust bearings 8, circumferential end surfaces of the half thrust bearings 8 may be formed as inclined end surfaces 83B as shown in FIG. 15, so that the inclined end surfaces form the abutment portions. In that case, the inclined end surfaces 83B are inclined by a predetermined angle θ3 with respective to a plane passing through the other circumferential end surfaces which are not inclined (actual split plane H). Alternatively, the circumferential end surfaces may have other shapes such as corresponding convex and concave shapes instead of the inclined end surfaces 83B.

In any case, those skilled in the art would understand that the thrust relief lengths L1 and L2 are defined as vertical lengths from the actual split plane H to the point where the surfaces of the thrust reliefs 82RB and 82FB intersect the inner edge of the sliding surface 81B.

Figure 16:
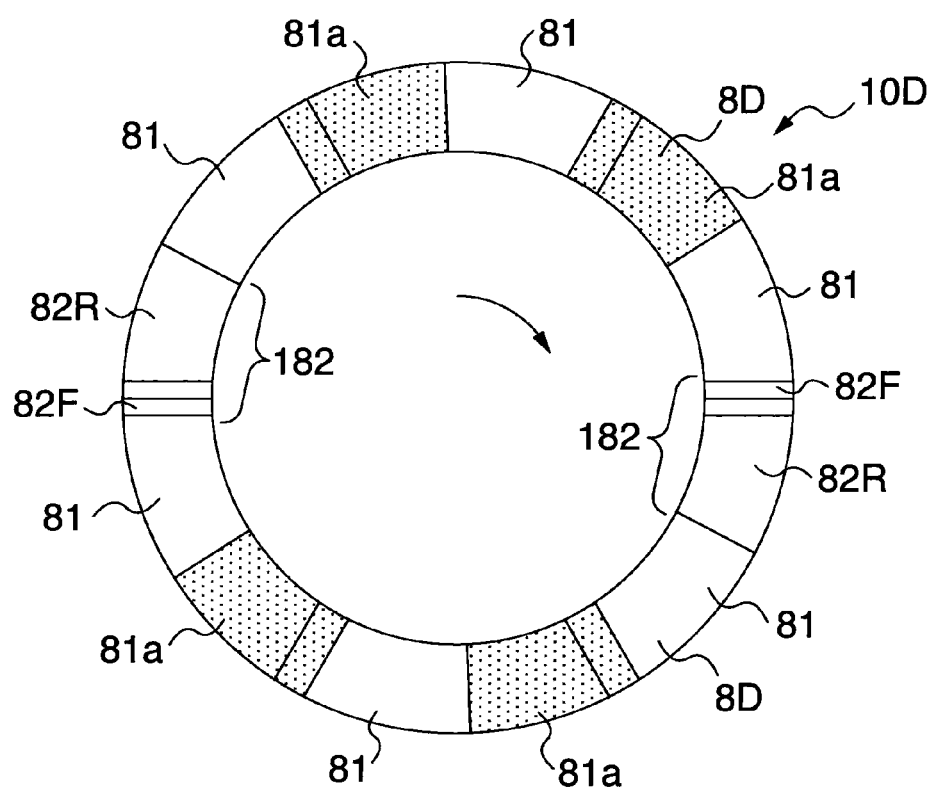
FIG. 16 is a front view of a thrust bearing of another embodiment.

As shown in FIG. 16, oil grooves 81a may be formed on a sliding surface 81 of a half thrust bearing 8D such that the oil grooves 81a have the same shape as recesses 182 formed at the abutment portions by pairing the front side thrust reliefs 82F and the rear side thrust reliefs 82R of the present invention. It is to be noted that, although one half thrust bearing has two oil grooves 81a on the sliding surface 81 in the embodiment, the present invention is not limited to this, and the half thrust bearing may have one, or three or more oil grooves. Also, although the oil grooves 81a in FIG. 16 are illustrated as recesses of a shape having the thrust relief clearance S formed in the thrust bearing 10C shown in FIG. 10 as an example, the shape of the oil grooves 81a is not limited to this.

Above embodiments have been described for the case where one bearing device 1 uses two thrust bearings 10 of the present invention, however, the present invention is not limited to this. The desired effect can also be obtained by using the thrust bearing 10 of the present invention on either of the axial end surfaces of the bearing housing and a thrust bearing with thrust reliefs of a conventional or other configuration on the other end surface. Alternatively, the thrust bearing 10 of the present invention may be a pair of bearing in which the half thrust bearings 8 constituting the thrust bearing 10 are integrally formed with the half bearings 7 on one or both axial end surfaces thereof.

The invention claimed is:

1. A thrust bearing for receiving an axial force of a crankshaft of an internal combustion engine, comprising a pair of half thrust bearings each having a semi-annular shape, the pair of half thrust bearings forming an annular shape by butting respective circumferential end surfaces thereof, wherein
    each half thrust bearing comprises a first thrust relief on a front side in a crankshaft rotational direction, a second thrust relief on a rear side in the crankshaft rotational direction, and a sliding surface arranged between the first and second thrust reliefs for receiving an axial force, the first and second thrust reliefs being formed so that a wall thickness of the half thrust bearing is made thinner toward the circumferential end surface, and
    a second thrust relief length of the second thrust relief positioned on a rear side of one of the half thrust bearings in a crankshaft rotational direction is larger than a first thrust relief length of the first thrust relief positioned on a front side of the other of the half thrust bearings in the crankshaft rotational direction;
    wherein the first thrust relief length extends from a first one of the circumferential ends to where the first thrust relief meets the sliding surface; and
    wherein the second thrust relief length extends from a second one of the circumferential ends to where the second thrust relief meets the sliding surface.

2. The thrust bearing according to claim 1, wherein a thrust relief depth at the circumferential end surface of the second thrust relief positioned on the rear side of the one of the half thrust bearings in the crankshaft rotational direction and a thrust relief depth at a circumferential end surface of the first thrust relief positioned on the front side of the other of the half thrust bearings in the crankshaft rotational direction are identical with each other in a radial direction of a butting portion of the circumferential end surfaces of the pair of half thrust bearings.

3. The thrust bearing according to claim 1, wherein a thrust relief depth of each one of the first and second thrust reliefs at the circumferential end surfaces is constant in the radial direction of the first and second thrust reliefs.

4. The thrust bearing according to claim 1, wherein at least the second thrust relief positioned on the rear side of each half thrust bearing in the crankshaft rotational direction consists of a flat surface or a curved surface.

5. The thrust bearing according to claim 1, wherein at least the second thrust relief positioned on the rear side of each half thrust bearing in the crankshaft rotational direction consists of two flat surface portions, two curved surface portions, or a flat surface portion and a curved surface portion.

6. The thrust bearing according to claim 1, wherein the second thrust relief positioned on the rear side of each half thrust bearing in the crankshaft rotational direction consists of a first curved surface portion adjacent to the circumferential end surface of the half thrust bearing and a flat surface portion adjacent to the sliding surface, the first curved surface portion being a convex curved surface bulging from a sliding surface side toward a back face side as seen in a radial direction.

7. The thrust bearing according to claim 1, wherein the second thrust relief positioned on the rear side of each half thrust bearing in the crankshaft rotational direction consists of a first curved surface portion adjacent to the circumferential end surface of the half thrust bearing and a second curved surface portion adjacent to the sliding surface, the first curved surface portion being a convex curved surface bulging from a sliding surface side toward a back face side as seen in a radial direction, the second curved surface portion being a convex curved surface bulging from the back face side toward the sliding surface side.

8. The thrust bearing according to claim 1, wherein a thrust relief depth of each one of the first and second thrust reliefs at the circumferential end surfaces is maximum at a radially inner end of the first and second thrust reliefs and is made shallower towards a radially outer end of the first and second thrust reliefs.

9. The thrust bearing according to claim 1, wherein the second thrust relief length of the second thrust relief positioned on the rear side of each half thrust bearing in the crankshaft rotational direction is minimum at a radially inner end of the first and second thrust reliefs and is made longer towards a radially outer end, and the first thrust relief length of the first thrust relief positioned on the front side of each half thrust bearing in the crankshaft rotational direction is constant from the radially inner end to the radially outer end of the first and second thrust reliefs.

10. The thrust bearing according to claim 9, wherein the second thrust relief positioned on the rear side of each half thrust bearing in the crankshaft rotational direction consists of a first curved surface portion adjacent to the circumferential end surface of the half thrust bearing and a flat surface portion adjacent to the sliding surface, the first curved surface portion being a convex curved surface bulging from a sliding surface side toward a back face side as seen in a radial direction.

11. The thrust bearing according to claim 9, wherein the second thrust relief positioned on the rear side of each half thrust bearing in the crankshaft rotational direction consists of a first curved surface portion adjacent to the circumferential end surface of the half thrust bearing and a second curved surface portion adjacent to the sliding surface, the first curved surface portion being a convex curved surface bulging from a sliding surface side toward a back face side as seen in a radial direction, the second curved surface portion being a convex curved surface bulging from the back face side toward the sliding surface side.

12. The thrust bearing according to claim 1, wherein the second thrust relief length of the second thrust relief positioned on the rear side of each half thrust bearing in the crankshaft rotational direction is constant from a radially inner end to a radially outer end of the first and second thrust reliefs, and the thrust relief length of the first thrust relief position on the front side of each half thrust bearing in the crankshaft rotational direction is constant from the radially inner end to the radially outer end of the first and second thrust reliefs.

13. A bearing device comprising:
a crankshaft of an internal combustion engine;
a pair of half bearings for supporting a journal portion of the crankshaft, crush reliefs being formed on an inner circumferential surface of each half bearing and adjacent to both circumferential ends of the half bearing;
a bearing housing having a retaining hole for retaining the pair of half bearings, the retaining hole being formed to penetrate through the bearing housing; and
at least one thrust bearing according to claim 1, the thrust bearing being disposed at an axial end surface of the bearing housing.

14. The bearing device according to claim 13, wherein the second thrust relief on the rear side of each half thrust bearing in the crankshaft rotational direction is formed so that the second thrust relief length at a radially inner end is longer than a crush relief length of the crush relief of a corresponding axial end portion of the half bearing.

15. The bearing device according to claim 14, wherein a formula: $L2 \geq CL \times 1.5$ is satisfied, where the second thrust relief length at a radially inner end of the second thrust relief positioned on the rear side in the crankshaft rotational direction is L2, and the crush relief length of the crush relief at the corresponding axial end portion of the half bearing is CL.

16. The bearing device according to claim 14, wherein the first thrust relief positioned on the front side of each half thrust bearing in the crankshaft rotational direction is formed so that the first thrust relief length at a radially inner end is shorter than a crush relief length of the crush relief at a corresponding axial end portion of the half bearing.

17. The bearing device according to claim 16, wherein a formula: $L1 \leq CL \times 1.5$ is satisfied, where the first thrust relief length at a radially inner end of the first thrust relief positioned on the front side in the crankshaft rotational direction is L1, and the crush relief length of the crush relief at the corresponding axial end portion of the half bearing is CL.

* * * * *